United States Patent
Rees et al.

(10) Patent No.: US 7,525,575 B2
(45) Date of Patent: Apr. 28, 2009

(54) VOICE ACTIVATED IMAGE CAPTURE DEVICE AND METHOD

(75) Inventors: David Llewellyn Rees, Berkshire (GB); Robert Anthony Walkinshaw Fraser, Berkshire (GB); Takashi Saito, Amstelveen (NL)

(73) Assignee: Canon Europa N.V. (NL)

( * ) Notice: Subject to any disclaimer, the term of this patent is extended or adjusted under 35 U.S.C. 154(b) by 760 days.

(21) Appl. No.: 10/937,343

(22) Filed: Sep. 10, 2004

(65) Prior Publication Data

US 2005/0128311 A1 Jun. 16, 2005

(30) Foreign Application Priority Data

Sep. 12, 2003 (GB) .................................. 0321446.7

(51) Int. Cl.
*H04N 5/232* (2006.01)
(52) U.S. Cl. .............................. 348/211.99; 348/211.4; 348/211.9
(58) Field of Classification Search . 348/211.1–211.99; 455/563; 382/246; 704/246
See application file for complete search history.

(56) References Cited

U.S. PATENT DOCUMENTS

| 4,951,079 | A | | 8/1990 | Hoshino et al. |
| 5,508,663 | A | * | 4/1996 | Konno .......................... 330/10 |
| 5,708,863 | A | * | 1/1998 | Satoh et al. .................... 396/52 |
| 5,959,667 | A | * | 9/1999 | Maeng ................... 348/211.99 |
| 6,049,766 | A | | 4/2000 | Laroche |
| 6,711,536 | B2 | | 3/2004 | Rees |
| 7,233,345 | B2 | * | 6/2007 | Yoneda ..................... 348/14.08 |
| 2003/0154078 | A1 | | 8/2003 | Rees |
| 2003/0163313 | A1 | | 8/2003 | Rees |
| 2005/0102133 | A1 | * | 5/2005 | Rees .......................... 704/205 |

FOREIGN PATENT DOCUMENTS

| EP | 1 187 099 | 3/2002 |
| JP | 60-205432 | 10/1985 |
| JP | 60-205433 | 10/1985 |
| JP | 2000-227633 | 8/2000 |
| JP | 2001-305642 | 11/2001 |
| JP | 2002-354335 | 12/2002 |

* cited by examiner

*Primary Examiner*—Tuan V Ho
*Assistant Examiner*—Gevell Selby
(74) *Attorney, Agent, or Firm*—Fitzpatrick Cella Harper & Scinto

(57) ABSTRACT

An image capture device is described having a remote photograph mode in which images can be captured without physical contact with the device. The device is activated by the user speaking a keyword. The image capturing device is arranged so that after being initialized in the remote capture mode of operation, it enters a standby state for a period of time in which it is unresponsive to utterances and, after a period of time sets itself into a listening state in which it can capture images in response to detecting spoken keywords.

36 Claims, 6 Drawing Sheets

VOICE ACTIVATED IMAGE CAPTURE DEVICE AND METHOD

The present invention relates to an apparatus and method for controlling a remote device by voice. The invention can be used, for example, to control the remote taking of photographs or movies by a camera, camcorder or other image capture device.

To take a photograph with a camera, a user usually holds the camera, looks through a viewfinder situated on the back of the camera to frame the scene and then presses a button to cause a shutter in the camera to release, thereby exposing light onto photographic film or a light capturing electronic device. However, in situations wherein the user desires to be included in the photograph, e.g. group photographs, portrait photographs etc., the user will typically be some distance remote from the camera and cannot take a photograph in the usual manner. The term "remote photograph" will be used herein to describe the situation where the user desires to take a photograph without making physical contact with the camera. In this situation, the user must have a way to activate the shutter without having to manually press a button on the camera.

It is known in the art to provide a timer on the camera in order to allow a remote photograph to be taken. With this camera, the user indicates that a remote photograph is to be taken by activating a specific switch on the camera and after a predetermined period of time a photograph is taken. However, this approach is inflexible and unsatisfactory for many scenarios since, if the timer period is too short, the photograph is taken before the user is ready, and if the timer period is too long, the user is left waiting for the camera to take the photograph. Further, if more than one remote photograph is to be taken, then the user must return to the camera each time in order to reset the timer period and then return to the desired location before the next photograph is taken.

It is also known in the art to provide a camera with a remote control. In this case, a remote photograph can be taken without reliance on a timer. However, the presence of the remote control adds to the overall cost of the camera. Further, the remote control is inconvenient since the user must carry it in addition to the camera in order to take remote photographs.

It is also known in the art to provide a camera with speech activated remote photograph taking, in which the camera is programmed to detect a specific spoken keyword using an automatic speech recognition unit. Such cameras have the advantage of not requiring a remote control whilst still allowing a photograph to be taken when the user is ready. However, these cameras may be unsuitable in fairly noisy situations where the keyword may not be detected (or may be falsely detected) due to corruption of the user's speech signal due to background noise and attenuation.

It is an aim of the present invention to provide an alternative technique of allowing a user to voice activate a remote photograph function on an image capture device.

According to one aspect, the present invention provides an image capture device comprising: means for receiving user input to activate the image capture device; means for generating an activation signal a predetermined time period after receiving the user input and outputting an indication to the user that the image capture device is listening for a spoken keyword; means for receiving a speech signal input by the user; means for processing the speech signal to detect the spoken keyword; and means for capturing an image in dependence upon a detection made by said speech processing means.

According to another aspect, the present invention provides a method of controlling an image capture device, the method comprising: receiving user input to activate the image capture device; generating an activation signal a predetermined time period after receiving the user input and outputting an indication to the user that the image capture device is listening for a spoken keyword; receiving a speech signal input by the user; processing the speech signal to detect the spoken keyword; and capturing an image in dependence upon a detection made by said speech processing step.

Exemplary embodiments of the present invention will now be described with reference to the accompanying drawings in which:

FIG. 1 schematically illustrates a group of people having their photograph taken, a member of the group saying the word "cheese" and a camera located remote from the group taking the photograph;

OVERVIEW

Figure 1:
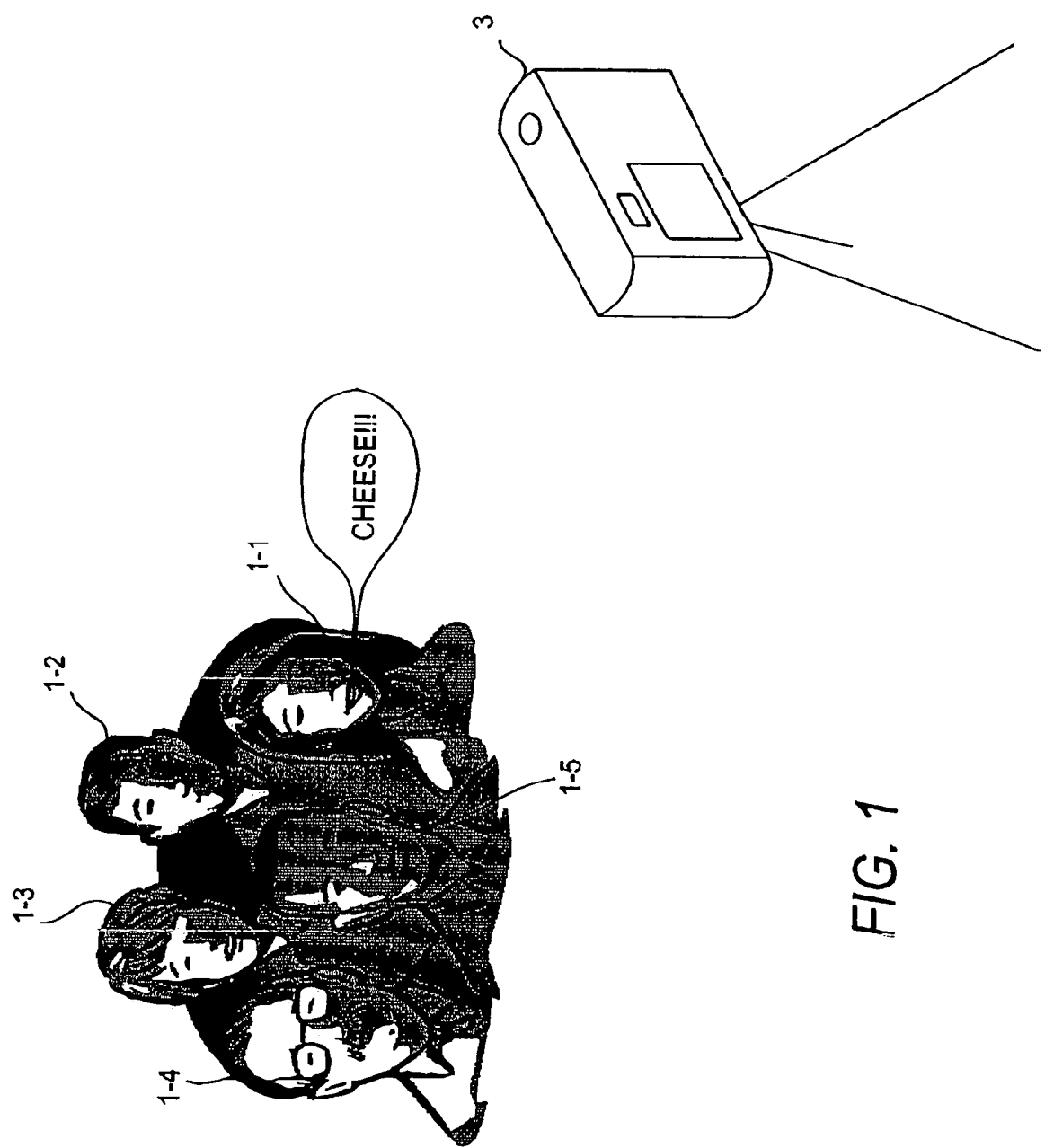

FIG. 1 shows a group of five people 1-1 to 1-5 who are posing for a photograph. One of the group 1-1 sets the camera 3 to take a remote photograph by pressing a specific button or setting an option on a user menu (not shown). The camera 3 then waits for a predetermined period of time to allow the user 1-1 to join the group before listening for a user's spoken keyword. When the group is ready for their photograph to be taken, one of them 1-1 utters a keyword (cheese in this embodiment) which is detected by the camera 3 which, in response, takes a photograph of the group.

Figure 2:
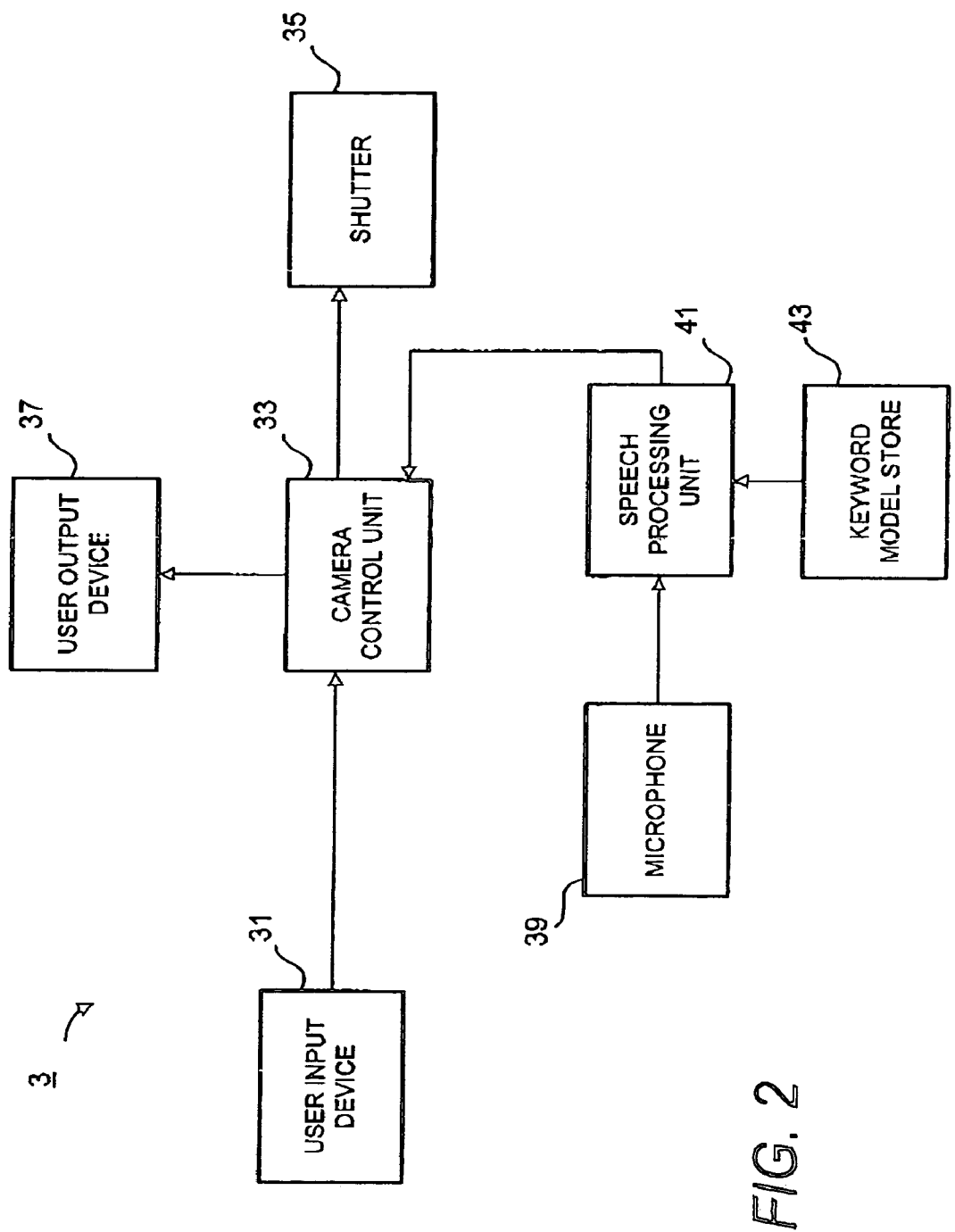
FIG. 2 is a schematic block diagram illustrating the main components of the camera shown in FIG. 1.

FIG. 2 is a schematic block diagram which shows the main components of the camera 3. In normal use, a user controls the camera 3 via a user input device 31 (such as a button or a dial). This user input is passed to a camera control unit 33 which controls the camera 3, for example to control a shutter 35 which allows light onto photographic film or a light sensitive electronic component such as a CCD or CMOS sensor (not shown). The camera control unit 33 also controls a user output device 37 (such as an LCD display or LED lights) in order to indicate camera and photograph status information (such as camera power, light intensity, flash mode etc.) to the user. As shown in FIG. 2, the camera 3 also includes a microphone 39 for converting a user's speech into corresponding electrical speech signals; a speech processing unit 41 which processes the electrical speech signals to detect the presence of a keyword in the user's speech and which informs the camera control unit 33 accordingly; and a keyword model store 43 storing keyword models to be used by the speech processing unit 41.

User Interface

Figure 3A:
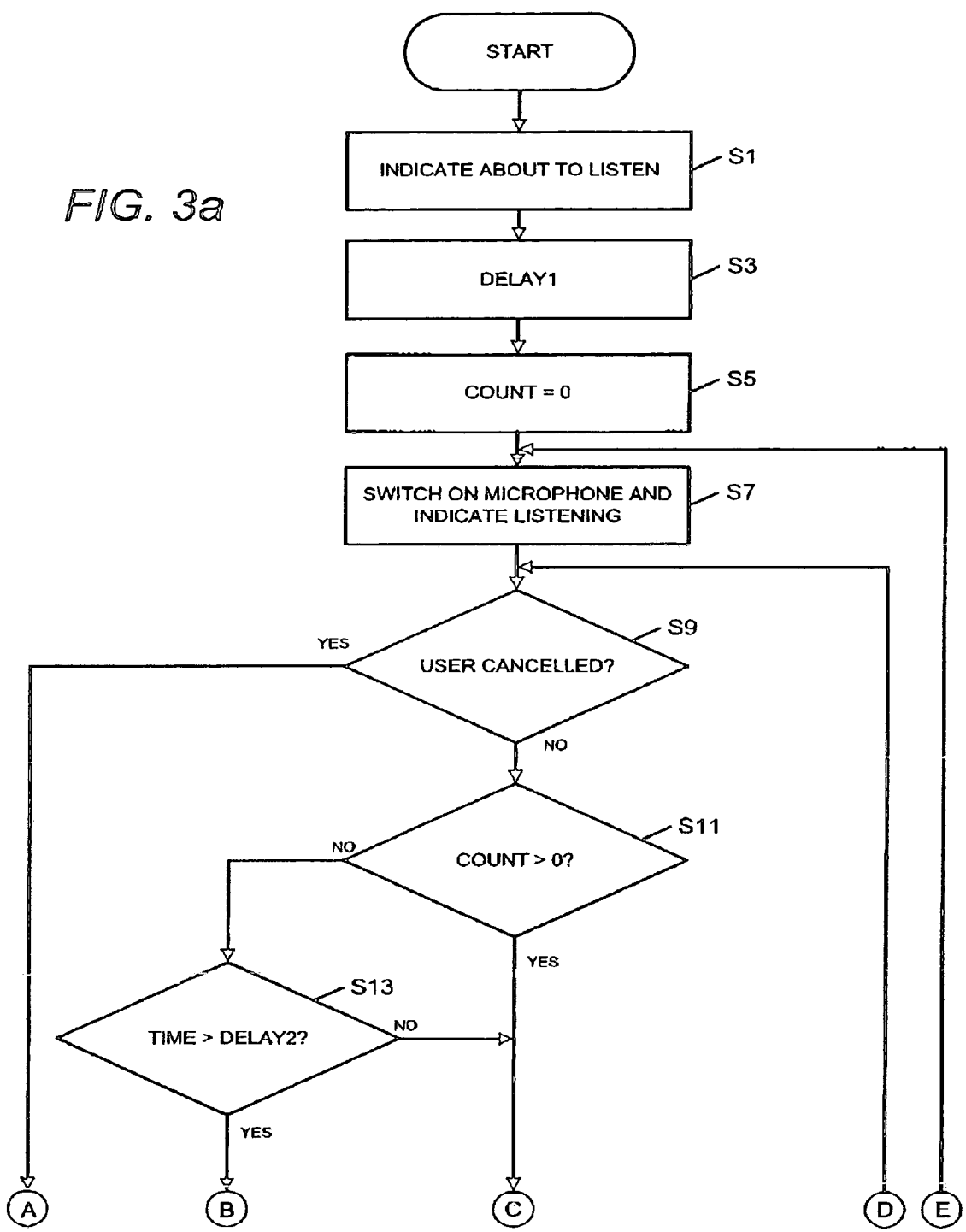
FIG. 3a shows a first part of a flow chart illustrating the operation of the camera shown in FIG. 1.
Figure 3B:
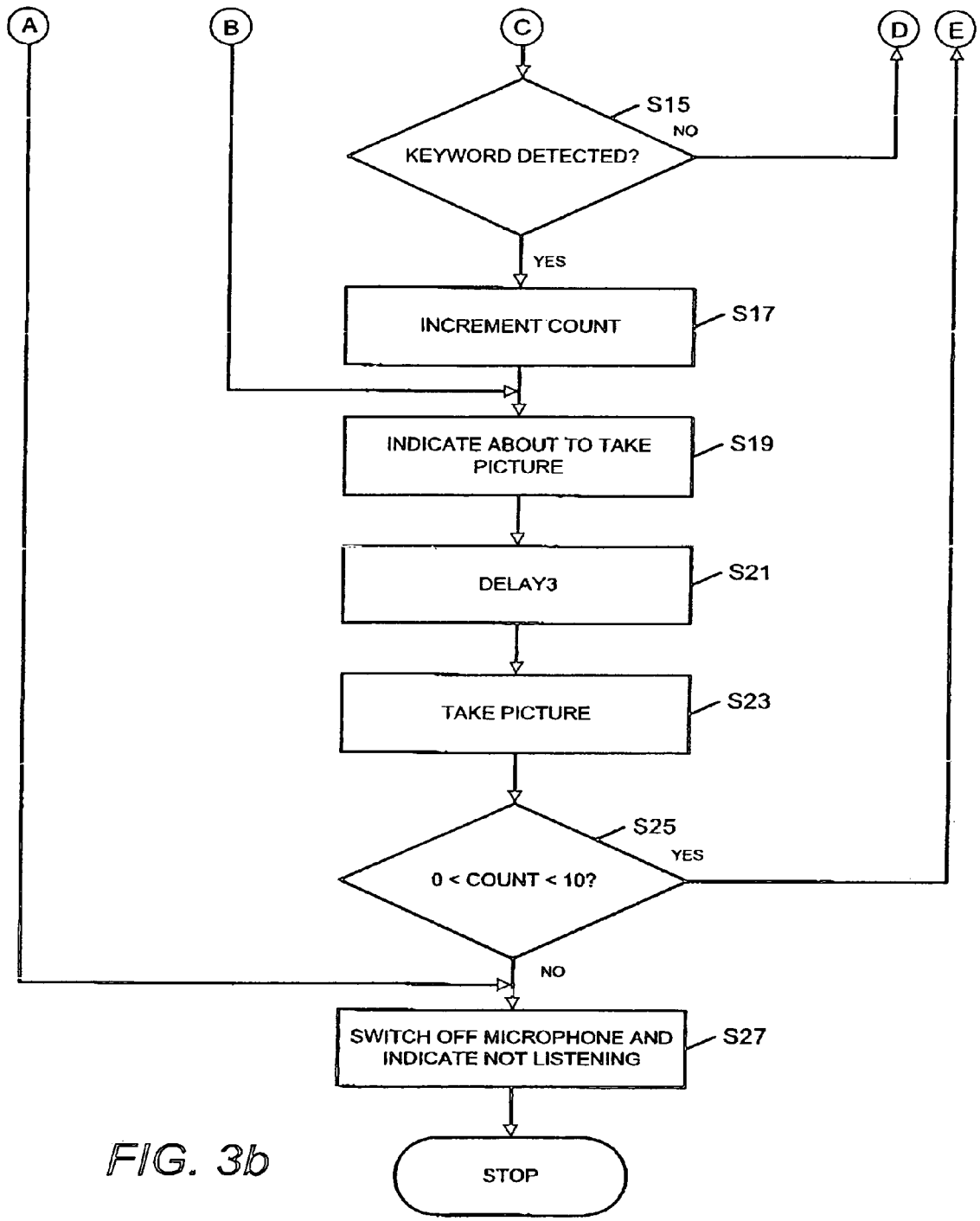
FIG. 3b shows the second part of the flow chart illustrating the operation of the camera shown in FIG. 1.

The operation of, and the user interaction with, the camera shown in FIG. 2 will now be explained with reference to FIGS. 3a and 3b. Initially, when the camera control unit 33 receives a user input via the user input device 31 indicating that a remote photograph is to be taken, it initialises internal timers (not shown) and outputs, at step S1, an indication on the user output device 37 that the camera 3 is about to start listening for the keyword. A timer in the camera control unit 33 causes the camera 3 to wait (in a standby state), at step S3, for a period (DELAY1) to allow the user to get into the desired position for the remote photograph. In this embodiment DELAY1 is set to 5 seconds. After this delay, processing proceeds to step S5 where a variable, COUNT, stored in the camera control unit 33 and used to indicate the number of remote photographs taken, is set to zero. At step S7, the camera control unit 33 generates an activation signal to switch on the microphone 39 and outputs an indication on the user output device 37 that the camera 3 is in a listening state and is listening for the keyword spoken by the user.

The processing then proceeds to step S9, where the camera control unit 33 checks if the user has cancelled the remote photograph operation. If he has, then processing proceeds to step S27 (shown in FIG. 3b), where the camera control unit 33 generates a deactivation signal to switch off the microphone 39 and outputs an indication on the user output device 37 that it is no longer listening for the keyword. If the user has not cancelled the remote photograph operation, then the processing proceeds to step S11 where the control unit 33 determines whether or not any photographs have already been taken (by comparing the value of the variable COUNT with zero). If no photographs have been taken, then the processing proceeds to step S13, where the control unit 33 checks the timer against a second delay (DELAY2), to ensure that the camera 3 does not wait indefinitely to take a remote photograph. In this embodiment DELAY2 is set to 30 seconds. Provided DELAY2 has not been reached, the control unit 33 checks whether or not the speech processing unit 41 has detected a keyword in the input speech signal from the microphone 39 (by comparing the input speech with the keyword models stored in the keyword model store 43). If a keyword has not been detected, then steps S9 to S15 are repeated.

Once a keyword has been detected at step S15, the processing proceeds to step S17, where the camera control unit 33 increments the variable COUNT and then outputs, in step S19, on the user output device 37 an indication to the user that a photograph is about to be taken. In this embodiment, the control unit 33 is then configured to wait for a user defined period (DELAY3) at step S21. This user defined delay can be programmed into the camera via the user input device 31 and can be set to zero so that a photograph is taken immediately. After this delay, at step S23, the camera control unit 33 sends a control signal to the shutter 35 to cause a photograph to be taken.

If at step S13, the control unit 33 determines that DELAY2 has elapsed before the keyword is detected, the processing proceeds to step S19 so that the camera 3 does not wait indefinitely for the user to say the keyword (or in case the camera 3 failed to detect the spoken keyword). Therefore, eventually, if the keyword is not detected, the camera 3 will automatically take a photograph.

In this embodiment, within a single remote photograph session, up to ten photographs may be taken. This test is controlled by the control unit 33 at step S25. If more photographs can be taken in the current session, then the processing returns to step S7. If ten photographs have already been taken then, at step S27, the control unit 33 generates a deactivation signal to switch off the microphone 39 and outputs on the user output device 37 an indication to the user that the camera 3 is no longer listening. The remote photograph operation then ends.

Second Embodiment

Figure 4A:
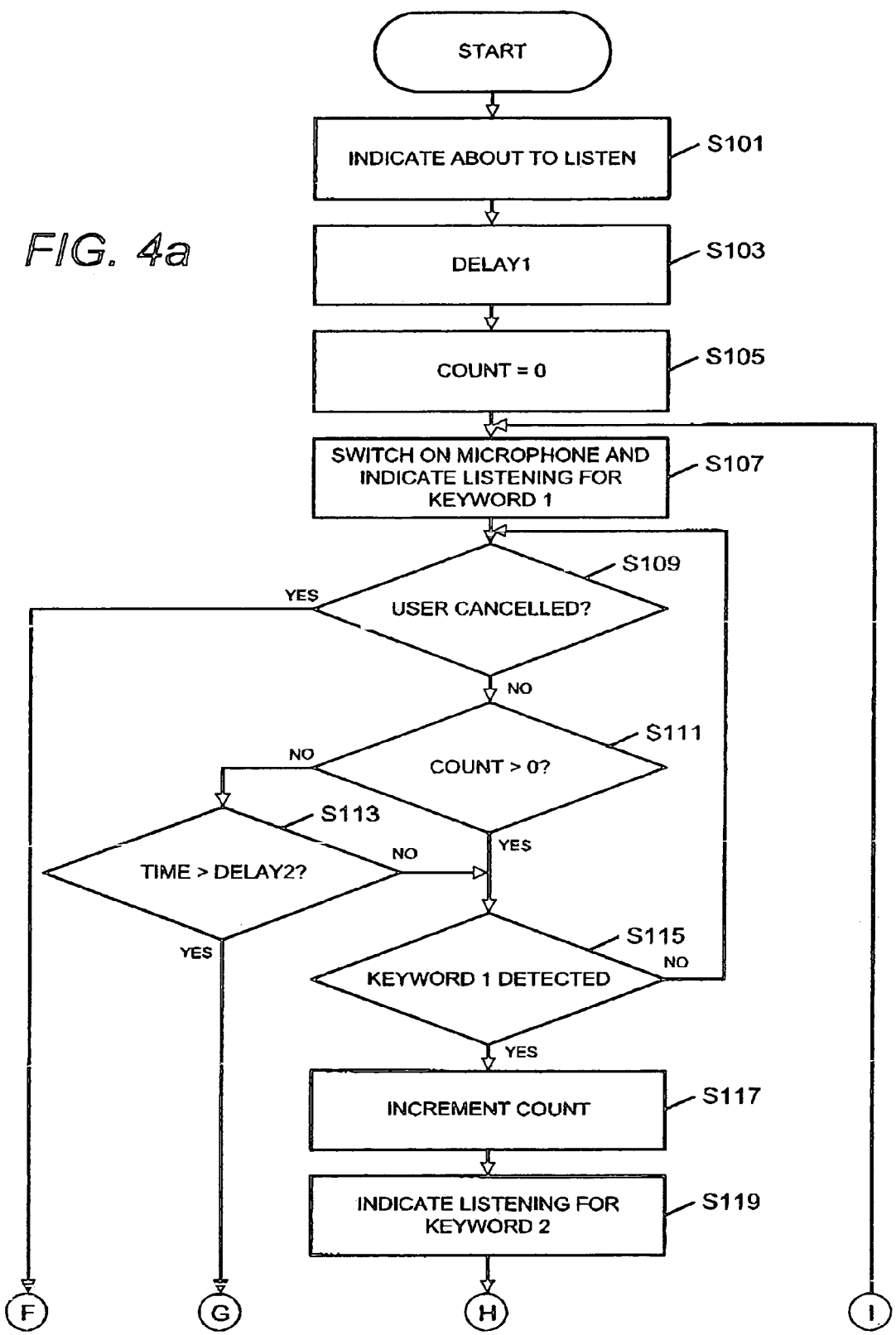
FIG. 4a is a first part of a flow chart illustrating the operation of the camera shown in FIG. 1 according to a second embodiment.
Figure 4B:
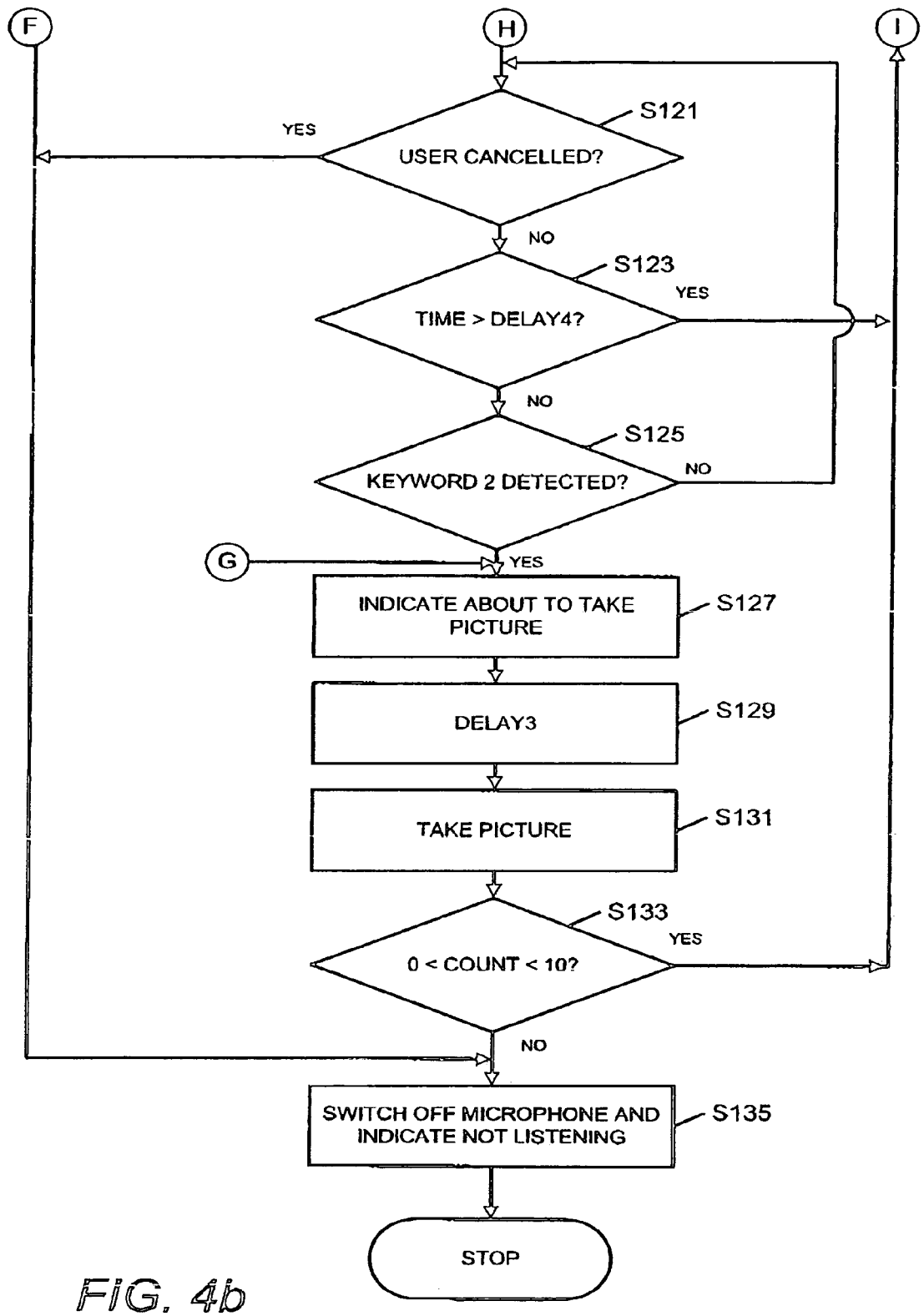
FIG. 4b is a second part of a flow chart illustrating the operation of the camera shown in FIG. 1 in the second embodiment.

In the first embodiment described above, the camera 3 is arranged to listen for the keyword over an extended period of time (DELAY2). It is therefore possible that the camera 3 may take more photographs than are desired, due to erroneous detection of the keyword. A second embodiment will now be described which employs a two-pass technique, where two keywords must be detected before the camera 3 will take a photograph, in order to try to reduce the number of erroneous photographs that are taken. In particular, in this second embodiment, detection of the first keyword causes the camera 3 to listen for the second keyword, within a smaller time frame than in the first embodiment. It is only after detection of the second keyword that the camera 3 takes the photograph. The operation of the camera 3 in this second embodiment will now be described with reference to FIGS. 4a and 4b.

When the camera control unit 33 receives a user input indicating that a photograph is to be taken, the camera control unit 33 resets its internal timers and outputs, at step S101, an indication on the user output device 37 that the system is about to start listening for a keyword The timer in the camera control unit 33 then causes the device to wait (in a standby state) at step S103 for a period (DELAY1) to allow the user to get into the desired position for the remote photograph In this embodiment DELAY1 is again set to 5 seconds. After DELAY1 has elapsed the processing proceeds to step S105 where a variable, COUNT, indicating the number of remote photographs taken is set to zero. At step S107 the camera control unit 33 generates an activation signal to switch on the microphone 39 and then outputs on the user output device 37 an indication that the camera 3 is in its listening mode and is listening for a first keyword spoken by the user.

At step S109, the camera control unit 33 checks if the user has cancelled the remote photograph operation. If he has, then the processing proceeds to step S135, where the camera control unit generates a deactivation signal to switch off the microphone 39 and outputs on the user output device 37 an indication that the camera 3 is no longer listening. If, however, at step S109, the camera control unit 33 determines that the remote photograph operation has not been cancelled, then the processing proceeds to step S111, where the camera control unit 33 determines whether or not any photographs have been taken in the current remote photograph session. If no photographs have been taken, then the processing proceeds to step S113 where, in a similar manner to the first embodiment, the timer is compared with the delay value DELAY2 (which in this embodiment is also set at 30 seconds). The purpose of the processing step S111 and S113 is to ensure that if the camera does not detect a keyword after a predetermined period of time that a photograph is automatically taken, Therefore, if it is determined at step S113 that the timer value is greater than DELAY2, then the processing proceeds to step S127 where the camera 3 indicates that it is about to take a picture.

If the variable COUNT is greater than zero or if the timer is less than DELAY2, then the processing proceeds to step S115 where the control unit 33 checks to see if the speech processing unit 41 has detected the first keyword. If it has not, then the processing returns to step S109. If the speech processing unit 41 has detected the first keyword, then the processing proceeds to step S117 where the camera control unit 33 increments COUNT and then outputs, in step S119, an indication on the user output device 37 that the camera 3 is listening for a second keyword from the user The processing then proceeds to step S121 where the camera control unit 33 again checks to see if the user has cancelled the remote photograph operation. If he has not, then the processing proceeds to step S123 where the timer is checked with a further delay value (DELAY4). This fourth delay is used to define how long the user has to utter the second keyword before the system times out and returns to step S107 and starts listening for the first keyword again. The value of DELAY4 is set to give the user enough time to utter the second keyword and in this embodiment is set to a value of two seconds.

If DELAY4 has not been exceeded, then the processing proceeds to step S125 where the camera control unit 33 checks if the speech processing unit 41 has detected the second keyword. If it has not, then the processing loops back to step S121. Once the second keyword has been detected, the processing proceeds to step S127 where the camera control unit 33 outputs an indication on the user output device 37 that a photograph is about to be taken. As in the first embodiment, the camera control unit 33 then waits for a user selectable delay (DELAY3) at step S129. After this delay, the processing proceeds to step S131 where the camera control unit 33 sends a signal to the shutter 35 to cause a photograph to be taken.

As in the first embodiment, in this second embodiment the camera control unit 33 is arranged to allow a maximum of ten photographs to be taken within a current remote photograph session. This is controlled in step S133 where the camera control unit 33 checks to see if the value of COUNT is between zero and ten. If it is, then the processing returns to step S127 where the camera indicates that it is again listening for the first keyword. If on the other hand COUNT is not between zero and ten, then processing proceeds to step S135, where the camera control unit 33 generates a deactivation signal to switch off the microphone 39 and outputs on the user output device 37 an indication that the camera 3 is no longer listening.

Alternatives and Modifications

Two embodiments have been described of a voice-activated camera which allows a user to take remote photographs by speaking one or more keywords. Two different user interface operations of the camera have been described. As those skilled in the art will appreciate, various modifications can be made to the above embodiments. Some of these modifications will now be described.

In the above embodiments, the camera was arranged to take a photograph after detecting a spoken keyword. When taking a photograph of a group, it is common for several members of the group to utter the keyword at slightly different times. Therefore, it is possible that in the above embodiments, the camera will detect each occurrence of the uttered keyword and trigger the taking of a photograph for each occurrence. In order to avoid this problem, in an alternative embodiment, the camera may be arranged to wait a predetermined period of time (e.g. a few seconds) before allowing further photographs to be taken in the current remote photograph session.

In the above embodiments, when a user activates a current remote photograph session, the camera only ends the current session under the following circumstances:

i) when no keywords are detected and the camera times out after DELAY2;

ii) the user cancels the operation via the user input device; or iii) the user has taken ten photographs in the current remote photograph session.

In an alternative embodiment, the camera may be arranged to allow a predetermined period time in which photographs can be taken within a single remote photograph session. In this way, the processing would end when the predetermined period of time has ended regardless of the number of photographs that have been taken.

In the first embodiment, when the remote photograph function was activated on the camera, the camera switched on the microphone and listened for the keyword. In an alternative embodiment, the camera may be arranged to switch on the microphone only during short time periods within the current remote photograph session in order to reduce the time that erroneous keyword detection can occur. This can be achieved, for example, by arranging the camera to operate during the current remote photograph session so that it is in a standby state for a period of time (e.g. 5 seconds) and then a listening state for a shorter period of time (e.g. 2 seconds) during which the microphone is switched on and an indication is output to the user indicating that the camera is listening. If the keyword is not detected when the camera is in this listening state, then the camera returns to the standby state for a further period of time before entering the listening state again. If the camera detects a keyword during the listening state, then like the first embodiment, it can take the photograph and then return to the standby state. In this way, the period of time in which the camera is actually listening for a keyword is reduced compared to the overall time in which the camera is in its remote photograph mode of operation. This therefore helps to reduce the number of false keyword detections and therefore the numbers of erroneous photographs that are taken.

In the above embodiments, the camera control unit generated an activation signal to switch the microphone on and a deactivation signal to switch the microphone off. In an alternative embodiment, the microphone may be switched on at all timer. In this case, the camera control unit may output the activation and deactivation signals directly to the speech processing unit to control when the speech processing unit actually processes the signals from the microphone. Alternatively still, both the microphone and the speech processing unit may be arranged to operate continuously. In this case, the control unit may be arranged to selectively respond to the speech processing unit only during the appropriate times when it should be listening for the keyword.

The invention claimed is:

1. An image capture device comprising:

a first receiver operable to receive a user input for initiating a remote image capture operation of the image capture device;

a second receiver operable to receive a speech signal representative of an utterance of a user;

a processor operable to process the received speech signal to detect a keyword in the utterance;

an image capturer operable to capture an image; and a controller responsive to said first receiver and said processor and operable to control said image capturer, such that said controller is operable to:

(a) in response to the user input, set the image capture device into a standby state for a period of time in which the image capture device is unresponsive to utterances of the user, and (b) after the period of time, set the image capture device into a listening state in which said controller is operable, in response to keyword detection by the processor, to cause said image capturer to capture an image.

2. An image capture device according to claim 1, wherein said controller is operable to cause said image capture device to capture an image a user-defined period after the keyword detection.

3. An image capture device according to claim 2, wherein said first receiver is operable to receive a user input defining the user-defined period.

4. An image capture device according to claim 1, wherein said controller is operable, after the keyword detection, to set the image capture device into the standby state for a predetermined period of time before returning the image capture device to the listening state.

5. An image capture device according to claim 1, wherein said controller is operable to cause the image capture device to cycle between the standby and listening states during the remote image capture operation.

6. An image capture device according to claim 1, wherein said controller is operable to cause said image capturer to capture an image in response to said processor detecting plural successive keywords.

7. An image capture device according to claim 6, wherein said controller is operable to cause said image capturer to capture an image in response to said processor detecting a plurality of successive different keywords.

8. An image capture device according to claim 1, wherein said controller is operable to output an indication when the image capture device is in the listening state and is listening for a keyword.

9. An image capture device according to claim 8, wherein said controller is operable to output a visible indication when the image capture device is in the listening state.

10. An image capture device according to claim 1, wherein said controller includes a counter for counting a number of images captured by said image capturer during the remote image capture operation.

11. An image capture device according to claim 10, wherein said controller is operable to use the counter to limit a number of images that can be captured during the remote image capture operation.

12. An image capture device according to claim 1, wherein if no keyword is detected by said processor during a predetermined period of time after the remote image capture operation has been initiated, said controller is operable to cause said image capturer to capture an image and to terminate the remote image capture operation.

13. An image capture device according to claim 1, wherein said controller is operable to terminate the remote image capture operation a predetermined period of time after the remote image capture operation was initiated.

14. An image capture device according to claim 1, wherein said second receiver comprises a microphone.

15. An image capture device according to claim 1, wherein said processor comprises a word model store for storing word models for one or more keywords, and wherein said processor is operable to detect a keyword by comparing the received speech signal with the word models.

16. An image capture device according to claim 1, wherein said controller is operable to set the image capture device into the listening state by switching on said second receiver.

17. An image capture device according to claim 1, wherein said controller is operable to set the image capture device into the listening state by switching on said processor.

18. An image capturing method carried out in an image capture device, the method comprising:
receiving a user input for initiating a remote image capture operation of the image capture device;
receiving a speech signal representative of an utterance of a user;
processing the received speech signal to detect a keyword in the utterance; and
controlling the image capture device to capture an image in response to the user input and keyword detection, said controlling step comprising:
(a) in response to the user input, setting the image capture device into a standby state for a period of time in which the image capture device is unresponsive to utterances of the user, and
(b) after the period of time, setting the image capture device into a listening state and causing the image capture device to capture an image in response to the keyword detection.

19. A method according to claim 18, wherein said controlling step further comprises causing the image capture device to capture an image a user defined period after the keyword detection.

20. A method according to claim 19, further comprising receiving a user input defining said user defined period.

21. A method according to claim 18, wherein said controlling step further comprises setting, after the keyword detection, the image capture device into the standby state for a predetermined period of time before returning the image capture device to the listening state.

22. A method according to claim 21, wherein said controlling step further comprises causing the image capture device to cycle between the standby and listening states during the remote image capture operation.

23. A method according to claim 18, wherein said controlling step further comprises causing the image capture device to capture an image in response to a detection of plural successive keywords.

24. A method according to claim 23, wherein said controlling step further comprises causing the image capture device to capture an image in response to a detection of a plurality of successive different keywords.

25. A method according to claim 18, wherein said controlling step further comprises outputting an indication to the user when the image capture device is in the listening state and is listening for a keyword.

26. A method according to claim 25, wherein said controlling step further comprises outputting a visible indication to the user when the image capture device is in the listening state.

27. A method according to claim 18, further comprising counting a number of images captured by the image capture device during the remote image capture operation.

28. A method according to claim 27, wherein said controlling step further comprises using a count from said counting step to limit a number of images that can be captured during the remote image capture operation.

29. A method according to claim 18, wherein said controlling step further comprises causing, if no keyword is detected during a predetermined period of time after the remote image capture operation has been initiated, the image capture device to capture an image and to terminate the remote image capture operation.

30. A method according to claim 18, wherein said controlling step further comprises terminating the remote image capture operation a predetermined period of time after the remote image capture operation was initiated.

31. A method according to claim 18, wherein the speech signal is received from a microphone.

32. A method according to claim 18, wherein said processing step further comprises detecting a keyword by comparing the received speech signal with stored word models representative of one or more keywords.

33. A method according to claim 18, wherein said controlling step further comprises setting the image capture device into the listening state by causing said speech signal receiving step to be performed.

34. A method according to claim 18, wherein the image capture device is set into the listening state by causing said processing step to be performed.

35. An image capture device comprising:
 first receiving means for receiving a user input for initiating a remote image capture operation of the image capture device;
 second receiving means for receiving a speech signal representative of an utterance of a user;
 processing means for processing the received speech signal to detect a keyword in the utterance;
 capturing means for capturing an image; and
 a controller responsive to said first receiving means and said processing means and operable to control said capturing means, wherein said controller is operable to:
  (a) in response to said user input, set the image capture device into a standby state for a period of time in which the image capture device is unresponsive to utterances, and
  (b) after the period of time, set the image capture device into a listening state in which said controller is operable, in response to keyword detection by the processor, to cause said capturing means to capture an image.

36. An image capture device comprising:
 a first receiver operable to receive a user input for initiating a remote image capture operation of the image capture device;
 a second receiver operable to receive a speech signal representative of an utterance of a user;
 a processor operable to process the received speech signal to detect a keyword in the user's utterance;
 an image capturer operable to capture an image; and
 a controller responsive to said first receiver and said processor and operable to control said image capturer;
 wherein said controller is operable, in response to the user input, to set the image capture device into a standby state for a period of time in which the image capture device is unresponsive to utterances of the user and, after said period of time, is operable to set the image capture device into an active state.

* * * * *